US006569566B2

(12) United States Patent
Fetcenko et al.

(10) Patent No.: US 6,569,566 B2
(45) Date of Patent: May 27, 2003

(54) COMPOSITE POSITIVE ELECTRODE MATERIAL AND METHOD FOR MAKING SAME

(75) Inventors: Michael A. Fetcenko, Rochester Hills, MI (US); Christian Fierro, Northville, MI (US); Stanford R. Ovshinsky, Bloomfield Hills, MI (US); Beth Sommers, Waterford, MI (US); Benjamin Reichman, West Bloomfield, MI (US); Kwo Young, Troy, MI (US); William Mays, Livonia, MI (US)

(73) Assignee: Ovonic Battery Company, Inc., Troy, MI (US)

(*) Notice: Subject to any disclaimer, the term of this patent is extended or adjusted under 35 U.S.C. 154(b) by 57 days.

This patent is subject to a terminal disclaimer.

(21) Appl. No.: 09/751,176
(22) Filed: Dec. 30, 2000
(65) Prior Publication Data

US 2002/0146505 A1 Oct. 10, 2002

Related U.S. Application Data

(62) Division of application No. 09/135,460, filed on Aug. 17, 1998, now Pat. No. 6,177,213.

(51) Int. Cl.[7] .................................................. H01M 4/62
(52) U.S. Cl. ..................... 429/218.1; 429/232; 429/223; 429/224; 429/220; 429/221; 429/225; 429/229; 429/231.5; 429/231.6; 429/231.9; 429/231.95
(58) Field of Search .............................. 429/232, 218.1, 429/223, 224, 220, 221, 225, 229, 231.5, 231.6, 231.9, 231.95

(56) References Cited

U.S. PATENT DOCUMENTS 6,348,285 B2 * 2/2002 Fetcenko et al. ........... 429/232

* cited by examiner

*Primary Examiner*—Laura Weiner
(74) *Attorney, Agent, or Firm*—Philip H. Schlazer; Marvin S. Siskind (57) ABSTRACT

A method for making a composite positive electrode material for use in electrochemical cells. The composite material comprises a particle of positive electrode material and a nucleating particle at least partially embedded within the interior of the particle of positive electrode material.

19 Claims, 4 Drawing Sheets

COMPOSITE POSITIVE ELECTRODE MATERIAL AND METHOD FOR MAKING SAME

RELATED APPLICATION INFORMATION

This application is a divisional application of U.S. patent application Ser. No. 09/135,460 filed on Aug. 17, 1998 now U.S. Pat. No. 6,177,213.

FIELD OF THE INVENTION

The instant invention relates generally to positive electrode materials for rechargeable batteries such as nickel hydroxide materials. More specifically, the instant invention relates to composite nickel hydroxide particulate having increased conductivity over the prior art material.

BACKGROUND OF THE INVENTION

In rechargeable alkaline cells, weight and portability are important considerations. It is also advantageous for rechargeable alkaline cells to have long operating lives without the necessity of periodic maintenance. Rechargeable alkaline cells are used in numerous consumer devices such as calculators, portable radios, and cellular phones. They are often configured into a sealed power pack that is designed as an integral part of a specific device. Rechargeable alkaline cells can also be configured as larger cells that can be used, for example, in industrial, aerospace, and electric vehicle applications.

There are many known types of Ni based cells such as nickel cadmium ("NiCd"), nickel metal hydride ("Ni-MH"), nickel hydrogen, nickel zinc, and nickel iron cells. NiCd rechargeable alkaline cells are the most widely used although it appears that they will be replaced by Ni-MH cells. Compared to NiCd cells, Ni-MH cells made of synthetically engineered materials have superior performance parameters and contain no toxic elements.

Ni-MH cells utilize a negative electrode that is capable of the reversible electrochemical storage of hydrogen. Ni-MH cells usually employ a positive electrode of nickel hydroxide material. The negative and positive electrodes are spaced apart in the alkaline electrolyte. Upon application of an electrical potential across a Ni-MH cell, the Ni-MH material of the negative electrode is charged by the electrochemical absorption of hydrogen and the electrochemical discharge of a hydroxyl ion, as shown in equation (1):

(1)

The negative electrode reactions are reversible. Upon discharge, the stored hydrogen is released to form a water molecule and release an electron. The reactions that take place at the nickel hydroxide positive electrode of a Ni-MH cell are shown in equation (2):

(2)

Ni-MH materials are discussed in detail in U.S. Pat. No. 5,277,999 to Ovshinsky, et al., the contents of which are incorporated by reference.

In alkaline rechargeable cells, the discharge capacity of a nickel based positive electrode is limited by the amount of active material, and the charging efficiencies. The charge capacities of a Cd negative electrode and a MH negative electrode are both provided in excess, to maintain the optimum capacity and provide overcharge protection. Thus, a goal in making the nickel positive electrode is to obtain as high an energy density as possible. The volume of a nickel hydroxide positive electrode is sometimes more important than weight. The volumetric capacity density is usually measured in mAh/cc and specific capacity is written as mAh/g.

At present, sintered or pasted nickel hydroxide positive electrodes are used in NiCd and Ni-MH cells. The process of making sintered electrodes is well known in the art. Conventional sintered electrodes normally have an energy density of around 480–500 mAh/cc. In order to achieve significantly higher capacity, the current trend has been away from sintered positive electrodes and toward foamed and pasted electrodes.

Sintered nickel electrodes have been the dominant nickel electrode technology for several decades for most applications. These consist of a porous nickel plaque of sintered high surface area nickel particles impregnated with nickel hydroxide active material either by chemical or electrochemical methods. While expensive, sintered electrodes provide high power, high reliability, and high cycle life, but not the highest energy density. They are likely to remain important for high reliability military and aerospace applications for some time.

Pasted nickel electrodes consist of nickel hydroxide particles in contact with a conductive network or substrate, preferably having a high surface area. There have been several variants of these electrodes including the so-called plastic-bonded nickel electrodes which utilize graphite as a microconductor and also including the so-called foam-metal electrodes which utilize high porosity nickel foam as a substrate loaded with spherical nickel hydroxide particles and cobalt conductivity enhancing additives. Pasted electrodes of the foam-metal type now dominate the consumer market due to their low cost, simple manufacturing, and higher energy density relative to sintered nickel electrodes.

Conventionally, the nickel battery electrode reaction has been considered to be a one electron process involving oxidation of divalent nickel hydroxide to trivalent nickel oxyhydroxide on charge and subsequent discharge of trivalent nickel oxyhydroxide to divalent nickel hydroxide, as shown in equation 2 hereinbelow.

Some recent evidence suggests that quadrivalent nickel is involved in the nickel hydroxide redox reaction. This is not a new concept. In fact, the existence of quadrivalent nickel was first proposed by Thomas Edison in some of his early battery patents. However, full utilization of quadrivalent nickel has never been investigated.

In practice, electrode capacity beyond the one-electron transfer theoretical capacity is not usually observed. One reason for this is incomplete utilization of the active material due to isolation of oxidized material. Because reduced nickel hydroxide material has a high resistance, the reduction of nickel hydroxide adjacent the current collector forms a less conductive surface that interferes with the subsequent reduction of oxidized active material that is farther away.

As discussed in U.S. Pat. No. 5,348,822, nickel hydroxide positive electrode material in its most basic form has a maximum theoretical specific capacity of 289 mAh/g, when one charge/discharge cycles from a βII phase to a βIII phase and results in one electron transferred per nickel atom. It was recognized in the prior art that greater than one electron transfer could be realized by deviating from the βII and βIII limitations and cycling between a highly oxidized γ-phase nickel hydroxide phase and the βII phase. However, it was also widely recognized that such gamma phase nickel hydroxide formation destroyed reversible structural stability and therefore cycle life was unacceptably degraded. A large number of patents and technical literature disclosed modifications to nickel hydroxide material designed to inhibit and/or prevent the destructive formation of the transition to the γ-phase, even though the higher attainable capacity through the use of γ-phase is lost.

Attempts to improve nickel hydroxide positive electrode materials began with the addition of modifiers to compensate for what was perceived as the inherent problems of the material. The use of compositions such as NiCoCd, NiCoZn, NiCoMg, and their analogues are described, for example, in the following patents:

U.S. Pat. No. Re. 34,752, to Oshitani, et al., reissued Oct. 4, 1994, describes a nickel hydroxide active material that contains nickel hydroxide containing 1–10 wt % zinc or 1–3 wt % magnesium to suppress the production of gamma-NiOOH. The invention is directed toward increasing utilization and discharge capacity of the positive electrode. Percent utilization and percent discharge capacity are discussed in the presence of various additives.

Oshitani, et al. describe the lengths that routineers in the art thought it was necessary to go to in order to inhibit γ-NiOOH. The patent states:

> Further, since the current density increased in accordance with the reduction of the specific surface area, a large amount of higher oxide γ-NiOOH may be produced, which may cause fatal phenomena such as stepped discharge characteristics and/or swelling. The swelling due to the production of γ-NiOOH in the nickel electrode is caused by the large change of the density from high density β-NiOOH to low density γ-NiOOH. The inventors have already found that the production of γ-NiOOH can effectively be prevented by addition of a small amount of cadmium in a solid solution into the nickel hydroxide. However, it is desired to achieve the substantially same or more excellent effect by utilizing additive other than the cadmium from the viewpoint of the environmental pollution."

U.S. Pat. No. 5,366,831, to Watada, et al., issued Nov. 22, 1994, describes the addition of a single Group II element (such as Zn, Ba, and Co) in a solid solution with nickel hydroxide active material. The Group II element is described as preventing the formation of gamma phase nickel hydroxide thereby reducing swelling, and the cobalt is described as reducing the oxygen overvoltage thereby increasing high temperature charging efficiency. Both oxygen overvoltage and charge efficiency are described as increasing with increasing cobalt.

U.S. Pat. No. 5,451,475, to Ohta, et al., issued Sep. 19, 1995, describes the positive nickel hydroxide electrode material as fabricated with at least one of the following elements added to the surface of the particles thereof: cobalt, cobalt hydroxide, cobalt oxide, carbon powder, and at least one powdery compound of Ca, Sr, Ba, Cu, Ag, and Y. The cobalt, cobalt compound, and carbon are described as constituents of a conductive network to improve charging efficiency and conductivity. The powdery compound is described as adsorbed to the surface of the nickel hydroxide active material where it increases the overvoltage, for evolution of oxygen, thereby increasing nickel hydroxide utilization at high temperature. Ohta, et al. claims that increased utilization in NiMH cells using the disclosed invention remains constant up to a high number of charge/discharge cycles and utilization does not drop as much at higher temperatures as it does in cells that do not embody the invention.

U.S. Pat. No. 5,455,125 to Matsumoto, et al., issued Oct. 3, 1995, describes a battery having a positive electrode comprising nickel hydroxide pasted on a nickel foam substrate with solid solution regions of Co and salts of Cd, Zn, Ca, Ag, Mn, Sr, V, Ba, Sb, Y, and rare earth elements. The addition of the solid solution regions is intended to control the oxygen overvoltage during charging. The further external addition of "electric conducting agents" such as powdered cobalt, cobalt oxide, nickel, graphite, "and the like," is also described. Energy density is shown as constant at 72 Wh/kg at 20° C. and 56 Wh/kg at 45° C. for embodiments of the invention over the life of the NiMH cell.

U.S. Pat. No. 5,466,543, to Ikoma, et al., issued Nov. 14, 1995, describes batteries having improved nickel hydroxide utilization over a wide temperature range and increased oxygen overvoltage resulting from the incorporation of at least one compound of yttrium, indium, antimony, barium, or beryllium, and at least one compound of cobalt or calcium into the positive electrode. Cobalt hydroxide, calcium oxide, calcium hydroxide, calcium fluoride, calcium peroxide, and calcium silicate are specifically described compounds. Additionally described additives are cobalt, powdery carbon, and nickel. The specification particularly describes AA cells using a positive electrode containing 3 wt % zinc oxide and 3 wt % calcium hydroxide as superior in terms of cycle life (250 cycles at 0° C., 370 cycles at 20° C., and 360 cycles at 40° C.) and discharge capacity (950 mAh at 20° C., 850 mAh at 40° C., and 780 mAh at 50° C.).

U.S. Pat. No. 5,489,314, to Bodauchi, et al., issued Feb. 6, 1996, describes mixing the nickel hydroxide positive electrode material with a cobalt powder compound followed by an oxidation step to form a beta cobalt oxyhydroxide on the surface of the nickel hydroxide powder.

U.S. Pat. No. 5,506,070, to Mori, et al., issued Apr. 9, 1996, describes nickel hydroxide positive electrode material containing 2–8 wt % zinc mixed with 5–15% cobalt monoxide. The zinc reduces swelling and the cobalt increases utilization. The capacity of the resulting electrode is stated as being "improved up to 600 mAh/cc" without further description.

U.S. Pat. No. 5,571,636, to Ohta, et al., issued Nov. 5, 1996, describes the addition of at least one powdery compound of Ca, Sr, Ba, Cu, Ag, and Y to the surface of nickel hydroxide active positive electrode material. This patent states that these compounds are adsorbed to the surface of the nickel hydroxide active material creating a conductive network that increases the oxygen overvoltage and improves utilization of the active material at high temperatures. Increased utilization in NiMH cells using the '636 invention remains constant up to a large number of cycles and utilization does not drop as much at higher temperatures as it does in cells that do not embody the invention.

In all of the prior art, the basic nickel hydroxide material is treated, most commonly, by the addition of a single element, usually Co compounds, to increase electrical conductivity and usually one other element, usually Cd or Zn, to suppress and/or prevent γ-phase formation. The mechanisms for the asserted improvements in all the above patents are attributable to the following effects:

1. Improved speed of activation, resistance to poisons, and marginal capacity improvement via increased utilization. At the present time, most commercial nickel metal hydride batteries achieve these effects through the external addition of up to 5 wt % cobalt and/or cobalt-containing compound. It is generally believed that the major reason cobalt is effective at these levels is because it creates an extensive external conductive network independent of the nickel hydroxide material. Frequently, powdered carbon, powdered cobalt metal, and powdered nickel metal are also added to create separate conductive networks and thereby improve utilization. Of course, a major drawback of increasing the amount of such additives is that the amount of active nickel hydroxide electrode material is correspondingly reduced, thereby reducing capacity. Further, since Co is expensive, the addition of even minimum amounts of Co greatly increases cost.

2. Cycle life is extended by decreasing swelling that is initiated by density changes between the oxidized and reduced states of the nickel hydroxide material. Swelling, in turn, is accelerated by the uncontrolled density changes between $\beta II$-$\beta III$ phase nickel hydroxide and $\alpha$-$\gamma$ or $\beta II$-$\gamma$ phase nickel hydroxide. Cd and Zn incorporated into the nickel hydroxide effectively reduce the swelling by reducing the difference in density in the charged and discharged material and increasing the mechanical stability of the nickel hydroxide material itself. This is accomplished by promoting oxygen evolution and thereby reducing charge acceptance which prevents the nickel hydroxide material from attaining the highly oxidized state (the $\gamma$-phase state). However, by suppressing or at least significantly inhibiting $\gamma$-phase formation, the nickel hydroxide is limited to transferring no more than one electron per Ni atom. Further, in order to effectively inhibit $\gamma$-phase nickel hydroxide, it is necessary to employ a relatively high wt % of the inhibitor element such as Zn or Cd, which high percentage results in a greatly reduced amount of active material being present thereby resulting in reduced electrochemical capacity.

3. The aforementioned "safety release" mechanism of oxygen evolution to avoid highly oxidized states of nickel hydroxide material actually is an impediment to high temperature operation because a significant increase in the rate of oxygen evolution occurs with increasing temperature. The effect of such increased oxygen evolution is a very substantial decrease in utilization and ultimately a reduction in energy storage at higher temperatures in the NiMH battery using these materials. At 55° C., for example, run times of a battery may be reduced by 35–55% compared to the room temperature performance of that battery.

Elevated operational temperature conditions aside, none of these prior art modifications result in more than an incremental improvement in performance and none result in a significant increase in the capacity of the nickel hydroxide material itself, even at room temperature. Further, these modifications fail to address the special operational requirements of NiMH batteries, particularly when NiMH batteries are used in electric vehicles, hybrid vehicles, scooters and other high capacity, high drain rate applications. Because NiMH negative electrodes have been improved and now exhibit an extremely high storage capacity, the nickel hydroxide positive electrode material is essentially the limiting factor in overall battery capacity. This makes improving the electrochemical performance of the nickel hydroxide material in all areas more important than in the past. Unfortunately, the elements currently added to the nickel hydroxide material result in insufficient improvements in performance before competing deleterious mechanisms and effects occur. For example, Cd cannot be used in any commercial battery because of the environmental impact thereof, and Co and Zn appear to become most effective only at levels that result in a significant decrease in cell capacity; more specifically, energy per electrode weight.

Ovshinsky and his team have developed positive electrode materials that have demonstrated reliable transfer of more than one electron per nickel atom. Such materials are described in U.S. Pat. Nos. 5,344,728 and 5,348,822 (which describe stabilized disordered positive electrode materials) and copending U.S. patent application Ser. No. 08/300,610 filed Aug. 23, 1994, and U.S. patent application Ser. No. 08/308,764 filed Sep. 19, 1994.

Previously all of the work on nickel hydroxide positive electrode material has concentrated on improving it's conductivity in two ways. First electrically conductive additives have been externally mixed with the nickel hydroxide materials used to produce pasted electrodes. Such additives include Co, CoO, Ni, Cu, and C. The additives are generally in the form of powder, fibers or the like. These techniques have achieved moderate success in that Ni-MH batteries have achieved impressive gains in high rate discharge performance. However, there are two remaining problems. First, the emergence of hybrid electric vehicles has demanded that Ni-MH batteries achieve 1000 W/kg of power. Conventional electric vehicle batteries achieve 250 W/kg and special designs achieve 500–600 W/kg. Second, even present power levels are achieved by a very expensive and elaborate positive electrode embodiment (i.e., an expensive foam metal skeleton and expensive use of cobalt compounds).

The second way in which artisans have increased the conductivity of nickel hydroxide is by co-precipitating cobalt hydroxide along with nickel hydroxide to increase it's internal conductivity. While NiCo co-precipitates have better conductivity and utilization than pure nickel hydroxide, the improvement can only be considered incremental with no room for further improvement.

The two methods discussed above, while increasing the power and capacity of the nickel hydroxide materials and electrodes have still not realized the full potential thereof. As stated above, there is still a need for significant gains in power and high rate discharge capability. Therefore, there is a need in the art for additional improvements in the conductivity of positive electrode materials and, specifically, in the conductivity of nickel hydroxide for use in rechargeable battery applications.

SUMMARY OF THE INVENTION

An objective of the present invention is to provide an active material for a positive electrode having increased conductivity. This and other objectives are satisfied by a composite positive electrode material for use in electrochemical cells. The material comprises a particle of positive electrode material; and a conductive material at least partially embedded within the particle of positive electrode material. The conductive material may be metallic particles such as nickel particles.

This and other objectives are satisfied by a method for producing a composite positive electrode material comprising a particle of positive electrode material and a conductive material at least partially embedded within the particle of positive electrode material, the method comprising the step of: combining a metal ion solution, a caustic solution, and a conductive material, whereby a precipitation solution including the composite positive electrode material is formed. The combining step may comprise the steps of mixing the conductive material with the metal ion solution to form a suspension; and mixing the suspension with the caustic solution.

This and other objectives are also satisfied by a composite positive electrode material comprising: a particle of positive electrode material; and a nucleating particle at least partially embedded within the particle of positive electrode material.

This and other objectives are also satisfied by a method for producing a composite positive electrode material comprising particles of positive electrode material having nucleating particles at least partially embedded therein, the method comprising the step of: combining a metal ion solution, a caustic solution, and the nucleating particles, whereby a precipitation solution including the composite positive electrode material is formed. The combining step may comprise the steps of: mixing the metal ion solution and the nucleating particles, thereby forming a suspension of the nucleating particles in the metal ion solution; and mixing the caustic solution with the suspension.

DETAILED DESCRIPTION OF THE INVENTION

The instant inventors have discovered improvements in positive electrode material for use in electrochemical cells and methods for making the improved materials. Disclosed herein is a composite positive electrode material for use in electrochemical cells. Generally, the composite positive electrode material comprises a particle of positive electrode material, and a conductive material which is at least partially embedded within the particle of positive electrode material. The conductive material may be totally embedded within the particle of positive electrode material.

Generally, the conductive material is any material which is electrically conductive. Preferably, the conductive material is chosen so that the conductivity of the composite positive electrode material is greater than the conductivity of the active positive electrode material alone.

The conductive material may comprise a metal. Examples of metals which may be used include, but are not limited to, nickel, nickel alloys, copper, and copper alloys. Preferably, the metal is nickel. As used herein, "nickel" refers to substantially pure nickel. Also, as used herein, "copper" refers to substantially pure copper.

It is noted that nickel has an atomic configuration comprising d-orbitals. While not wishing to be bound by theory, it is believed that the d-orbitals may effect the active positive electrode material surrounding the nickel material.

The conductive material may also comprise a material selected from the group consisting of oxides, nitrides, carbides, suicides, and borides. The conductive material may comprise carbon, or graphite. The conductive material may comprise copper oxide, cobalt oxide, or indium tin oxide.

Figure 1:
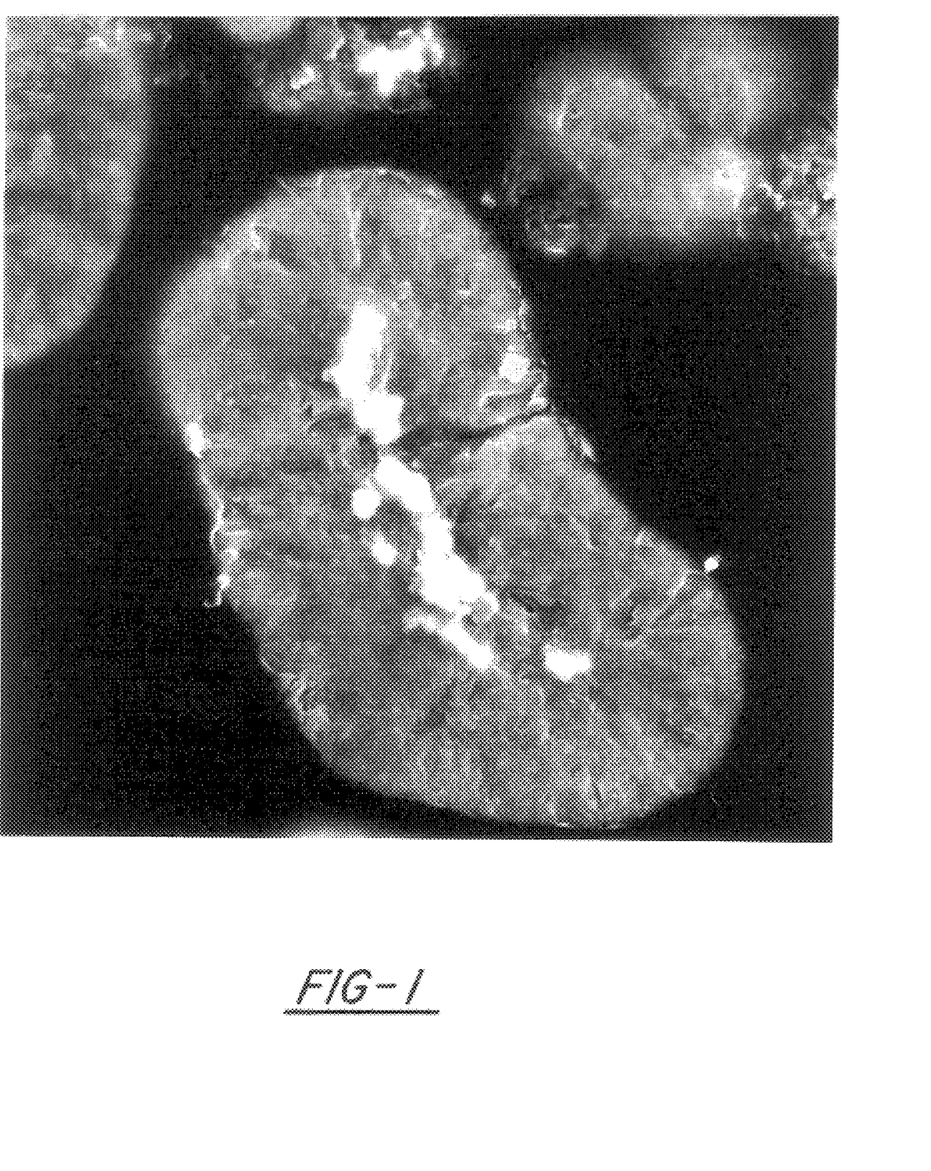
FIG. 1 shows a photomicrograph, at magnification of 10,000×, of an embodiment of the composite material of the present invention.

The conductive material may be in the form of at least one conductive particle which is at least partially embedded in the particle of positive electrode material. Preferably, the conductive particle is metallic. More preferably, the conductive particle is a nickel particle. FIG. 1 shows a photomicrograph, at magnification of 10,000×, of an embodiment of the composite material of the present invention. In this embodiment, the composite material comprises a particle of positive electrode material 1, and a nickel particle 3 which is totally embedded in the particle of positive electrode material 1.

The conductive material may comprise a plurality of conductive particles which are at least partially embedded within the particle of positive electrode material. The plurality of conductive particles may be isolated from one another. Alternately, at least some of the particles may be touching others so as to form a conductive network of particles.

The conductive particles may have a variety of shapes and sizes. For example, the particles may be substantially spherical. Alternately, the particles may be elongated wherein one dimension is longer than another dimension. For example, the particles may be ellipsoidal or cylindrical. As well, the particles may be in the form of threadlike fibers. These elongated particles may have an average length which is less than or equal to about 10 microns. As well they may have an average diameter of less than or equal to about 1.0 micron. These sizes are merely reference points and may be varied within the scope of the invention. An example of conductive particles are the INCO T-210 nickel particles. The INCO T-210 nickel particles have a particle morphology with an average sub-micron Fisher diameter of about 0.9 microns, an apparent density of about 0.6 grams per $cm^3$, and a BET of about 1.75 $m^2/g$.

Figure 2:
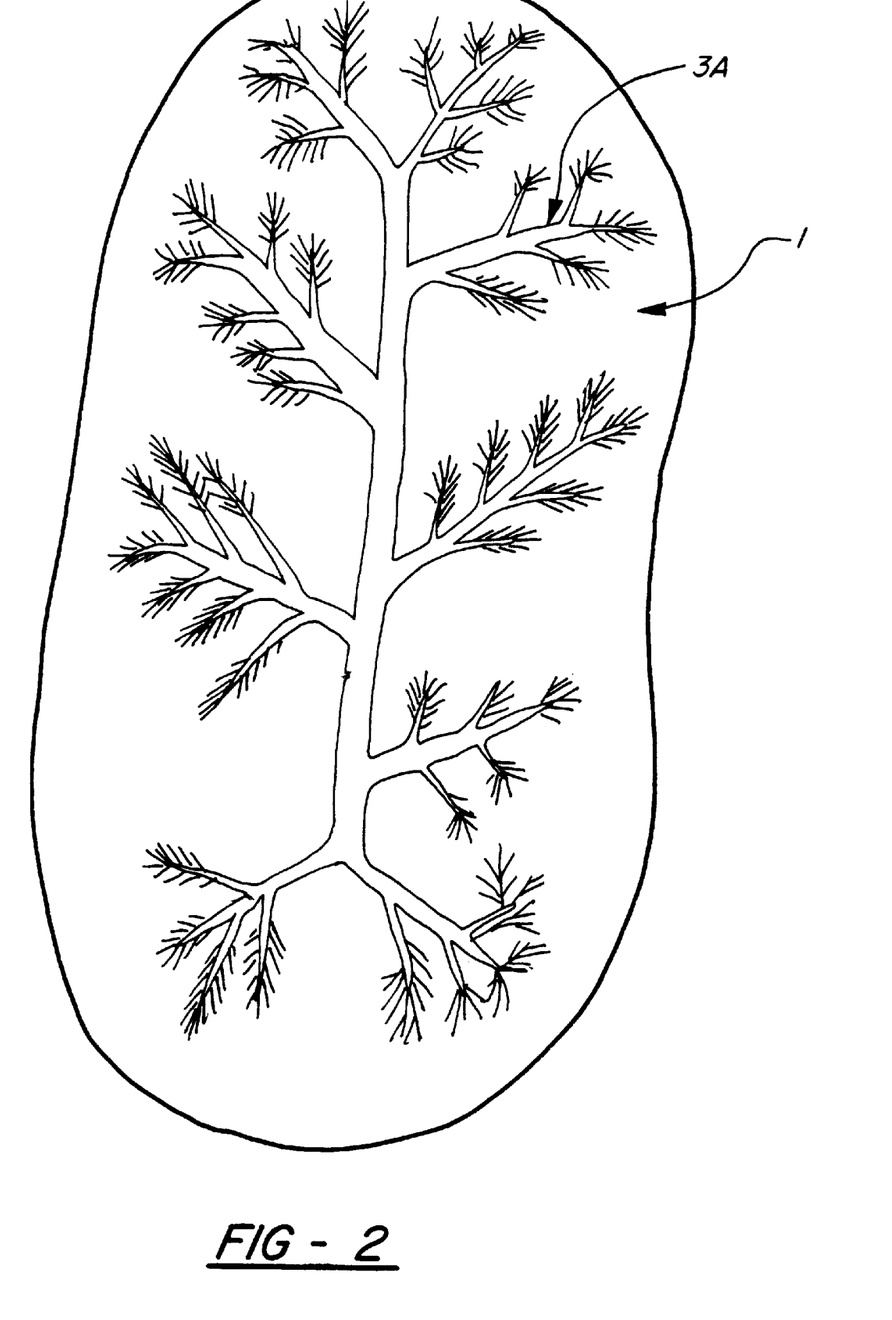
FIG. 2 is a stylized drawing of an embodiment of the composite material where the conductive material is in the form of a conductive network.

The conductive material may take the form of a conductive network. The conductive network may have various topologies. One example of a conductive network is a lattice structure which may be formed by the interconnection of conductive particles, fibers, strands, and the like. Another example of a conductive network is the branching tree-like structure that is shown in FIG. 2. The conductive network 3A branches out throughout the active positive electrode particle 1. Another example of a conductive network is one comprising one or more carbon nanotubes and/or fullerenes.

While not wishing to be bound by theory, the inventors believe that the embedded conductive material, such as the nickel particle 3 shown in FIG. 1, serves one or both of two possible roles in the composite material. First, the inventors believe that the conductive material serves as an electronically conductive pathway through the active positive electrode material, thereby increasing the useable capacity of the active material. The internal conductive pathway also improves the ionic transport within the active material and prevents portions of the active material from becoming electrically isolated by reducing the transport distance through the active material and/or optimizing alignment of crystallite pathways.

The present inventors believe that one factor that limits the nickel electrode reaction to capacities equivalent to one electron or less is the underutilization of the nickel hydroxide active material. It is believed that the underutilization is caused by electronic isolation of oxidized nickel oxyhydroxide (NiOOH) material by the formation of highly resistive nickel hydroxide ($Ni(OH)_2$) material adjacent to the active material, and by poor transport of ions to the inner portions of the electrode which are remote from the electrolyte. The present invention, overcomes such electronic isolation and ionic transport limitations. Hence, in this invention, electronic isolation of the active material is reduced or avoided by providing an electronically conductive pathway in the interior of the nickel hydroxide particles. This allows for added electronic pathways which reduce or prevent isolation of the active material by the more resistive reduced nickel hydroxide material.

The second role that the conductive material, such as the nickel particle 3, may play is that of a nucleation site for the growth of nickel hydroxide crystallites. The particles of nickel hydroxide material comprise crystallites, and the nickel particle 3 behaves as a "nucleating particle" (i.e., a nucleation site for the growth of the nickel hydroxide crystallites). As a nucleation site, the nickel particle 3 may orient the nickel hydroxide crystallites as they deposit onto the nickel particle during precipitation. Furthermore, the nickel particle 3 may also influence the size and/or shape of the nickel hydroxide crystallites. Each nickel hydroxide particle is composed of many very fine crystallites which may have an improved crystallographic orientation within the boundary of the crystallite.

The protonic conductivity (i.e., the conductivity of protons) in a typical nickel hydroxide particle is dominated by (1) conduction within crystallites and (2) conduction across the grain boundaries between adjacent crystallites. When the crystallite size is too large, the fully discharged nickel hydroxide does not have enough vacancies, created at the grain boundaries for the initial charging current to provide for a proton to hop from one vacancy to another vacancy, and therefore such large crystallites provide for relatively poor conductivity. When the crystallite size is too small, the adjacent crystal lattice conduction networks will not be aligned due to the presence of too many grain boundary vacancies for the protons to hop across and protonic conductivity is thereby impeded. There exists an optimum crystallite size in which the proper number of grain boundary vacancies are present. In these latter materials, sufficient vacancies are present for proper inter-crystallite conductivity to occur and the protons have sufficient room to follow the proper conductive path through the crystallite it then enters.

In addition to the proper crystallite size of the nickel hydroxide material, the crystallites are believed to require proper orientation to be highly conductive. That is, if there are discontinuities in the crystallite orientation from one crystallite to another then the crystallites that are improperly oriented for lower resistance current flow will dominate the resistance of the material. Conversely, if all of the crystallites are properly oriented, the conductivity of the nickel hydroxide material may be increased. The inventors believe that the nickel particle 3 may preferentially orient the crystallites of nickel hydroxide in this highly conductive orientation as they deposit, such that the nickel hydroxide has a higher protonic conductivity than nickel hydroxide deposited in a random manner.

Thus, it is possible that the addition of nucleation sites alter the size and/or shape of the crystallites. In a random precipitation, it might be expected that crystallites would have a spherical shape, while in the present invention the crystallites could have a more elongated shape. While not wishing to be bound by theory, it is possible that protonic conduction is preferential along the 101 axis of the nickel hydroxide. The role of the nucleation sites could be to reduce the distance along the 101 plane to the crystallite boundary or to orient the 101 planes from one crystallite to an other for enhance conduction.

Hence, an alternate embodiment of the present invention, is a composite positive electrode material comprising a particle of active positive electrode material (such as nickel hydroxide), and a "nucleating particle" which is at least partially embedded within the particle of positive electrode material. The nucleating particle does not have to be an electrically conductive material. Instead, the nucleating particle need only provide a nucleation site for the growth of crystallites forming from the positive electrode material. As discussed above, the addition of nucleation sites may orient the deposited crystallites of the positive electrode material such that the conductivity of the material is increased. The nucleation sites may provide for the proper deposition surface to orient the crystallites as well as to determine the average size and/or shape of the crystallites so as to increase the conductivity of the material.

The nucleating particles are not limited to any specific shape, size or topology. Examples of shapes include, but not limited to, substantially spherical, substantially flat, elongated, cylindrical, ellipsoidal, fiber-like, cubic, parallelopiped, etc. As well, the surfaces of the nucleating particles may be varied to effect the growth of the positive electrode material crystals. For example, the nucleating particles may be partially etched to provide either a roughened surface or an oxide free surface.

Further, it may also be possible to provide a "nucleation structure" having a more complex topology that a single nucleating particle and which also acts as a surface for the growth of crystals of positive electrode material. For example, the nucleation structure may be a plurality of connected nucleating particles. The nucleation structure may have the form of a lattice such as a matrix, screen or foam. The nucleation structure may have a topology similar to that of the conductive network shown in FIG. 2. As well, the nucleation structure may have a topology sufficient to increase the conductivity of the positive electrode material by appropriately orienting the growth of the crystals and/or appropriately determining the size of the crystals and/or the shape of the crystals.

The active positive electrode material used in the present invention may be may be any type of positive electrode material known in the art. Examples include nickel hydroxide material and manganese hydroxide material. It is within the spirit and intent of this invention that any and all kinds of nickel hydroxide, or positive materials in general, may be used. Even pure nickel hydroxide without cobalt, a material with poor conductivity for commercial application, may be transformed into a viable positive electrode material via the internally embedded nickel particles or fibers described herein.

The nickel hydroxide material may be a disordered material. The use of disordered materials allow for permanent alteration of the properties of the material by engineering the local and intermediate range order. The general principals are discussed in U.S. Pat. No. 5,348,822, the contents of which are incorporated by reference herein. The nickel hydroxide material may be compositionally disordered. "Compositionally disordered" as used herein is specifically defined to mean that this material contains at least one compositional modifier and/or a chemical modifier. Also, the nickel hydroxide material may also be structurally disordered. "Structurally disordered" as used herein is specifically defined to mean that the material has a conductive surface and filamentous regions of higher conductivity, and further, that the material has multiple or mixed phases where alpha, beta, and gamma-phase regions may exist individually or in combination.

The nickel hydroxide material may comprise a compositionally and structurally disordered multiphase nickel hydroxide host matrix which includes at least one modifier chosen from the group consisting of Al, Ba, Bi, Ca, Co, Cr, Cu, F, Fe, In, K, La, Li, Mg, Mn, Na, Nd, Pb, Pr, Ru, Sb, Sc, Se, Sn, Sr, Te, Ti, Y, and Zn. Preferably, the nickel hydroxide material comprises a compositionally and structurally disordered multiphase nickel hydroxide host matrix which includes at least three modifiers chosen from the group consisting of Al, Ba, Bi, Ca, Co, Cr, Cu, F, Fe, In, K, La, Li, Mg, Mn, Na, Nd, Pb, Pr, Ru, Sb, Sc, Se, Sn, Sr, Te, Ti, Y, and Zn. These embodiments are discussed in detail in commonly assigned U.S. Pat. No. 5,637,423 the contents of which is incorporated by reference herein.

The nickel hydroxide materials may be multiphase polycrystalline materials having at least one gamma-phase that contain compositional modifiers or combinations of compositional and chemical modifiers that promote the multiphase structure and the presence of gamma-phase materials. These compositional modifiers are chosen from the group consisting of Al, Bi, Co, Cr, Cu, Fe, In, LaH$_3$, Mg, Mn, Ru, Sb, Sn, TiH$_2$, TiO, Zn. Preferably, at least three compositional modifiers are used. The nickel hydroxide materials may include the non-substitutional incorporation of at least one chemical modifier around the plates of the material. The phrase "non-substitutional incorporation around the plates", as used herein means the incorporation into interlamellar sites or at edges of plates. These chemical modifiers are preferably chosen from the group consisting of Al, Ba, Ca, Co, Cr, Cu, F, Fe, K, Li, Mg, Mn, Na, Sr, and Zn.

As a result of their disordered structure and improved conductivity, the nickel hydroxide materials do not have distinct oxidation states such as $2^+$, $3^+$, or $4^+$. Rather, these materials form graded systems that pass 1.0 to 1.7 and higher electrons.

The nickel hydroxide material may comprise a solid solution nickel hydroxide material having a multiphase structure that comprises at least one polycrystalline gamma-phase including a polycrystalline gamma-phase unit cell comprising spacedly disposed plates with at least one chemical modifier incorporated around said plates, said plates having a range of stable intersheet distances corresponding to a $2^+$ oxidation state and a $3.5^+$, or greater, oxidation state; and at least three compositional modifiers incorporated into the solid solution nickel hydroxide material to promote the multiphase structure. This embodiment is fully described in commonly assigned U.S. Pat. No. 5,348,822, the contents of which is incorporated by reference herein.

Preferably, one of the chemical modifiers is chosen from the group consisting of Al, Ba, Ca, Co, Cr, Cu, F, Fe, K, Li, Mg, Mn, Na, Sr, and Zn. The compositional modifiers may be chosen from the group consisting of a metal, a metallic oxide, a metallic oxide alloy, a metal hydride, and a metal hydride alloy. Preferably, the compositional modifiers are chosen from the group consisting of Al, Bi, Co, Cr, Cu, Fe, In, LaH$_3$, Mn, Ru, Sb, Sn, TiH$_2$, TiO, and Zn. In one embodiment, one of the compositional modifiers is chosen from the group consisting of Al, Bi, Co, Cr, Cu, Fe, In, LaH$_3$, Mn, Ru, Sb, Sn, TiH$_2$, TiO, and Zn. In another embodiment, one of the compositional modifiers is Co. In an alternate embodiment, two of the compositional modifiers are Co and Zn. The nickel hydroxide material may contain 5 to 30 atomic percent, and preferable 10 to 20 atomic percent, of the compositional or chemical modifiers described above.

The disordered nickel hydroxide electrode materials may include at least one structure selected from the group consisting of (i) amorphous; (ii) microcrystalline; (iii) polycrystalline lacking long range compositional order; and (iv) any combination of these amorphous, microcrystalline, or polycrystalline structures. A general concept of the present invention is that a disordered active material can more effectively accomplish the objectives of multi-electron transfer, stability on cycling, low swelling, and wide operating temperature than prior art modifications.

Also, the nickel hydroxide material may be a structurally disordered material comprising multiple or mixed phases where alpha, beta, and gamma-phase region may exist individually or in combination and where the nickel hydroxide has a conductive surface and filamentous regions of higher conductivity.

Additional improvement of the nickel hydroxide material of the present invention are possible when these disordered materials are combined with electrolytes where the electrolyte comprises at least one element chosen from the group consisting of Ba, Ca, Cs, K, Li, Na, Ra, Rb, and Sr, combined with at least one member of the group consisting of Br, Cl, F, OH. Particular examples of such electrolytes are formulations of KOH, NaOH, LiOH and/or CsF, and KOH and CsOH.

Also disclosed herein is a method for producing a composite positive electrode material comprising a particle of positive electrode material, and a conductive material at least partially embedded within the particle of positive electrode material. The general method for making the composite material is by precipitation of a positive electrode material (such as the nickel hydroxide material) onto the conductive material suspended in a precipitation bath. The specific method can be varied widely, as will be described hereinbelow, as long as the positive electrode material is deposited onto the conductive material.

The method requires a source of metal ion solution, a source of the conductive material, and a source of caustic (sodium hydroxide) be provided. Generally, the method comprises the step of combining the metal ion solution, the caustic solution and the conductive material so that a precipitation solution which includes the composite positive electrode material is formed.

A major proportion of the metal ion solution should include the active materials main metal ion, for instance nickel ions, for deposition of a nickel hydroxide material. While nickel ions are typically used, manganese ions (for deposition of a manganese hydroxide solution) may also be used. Also, other metal ions may be added to the metal ion solution to modify and enhance the performance of the nickel hydroxide material. The metal ion solution may further comprise one or more metal ions selected from the group consisting of Al, Ba, Bi, Ca, Co, Cr, Cu, Fe, In, K, La, Li, Mg, Mn, Na, Nd, Pb, Pr, Ru, Sb, So, Se, Sn, Sr, Te, Ti, Y, and Zn. The metal ion solution may be selected from the group consisting of a metal sulfate solution, a metal nitrate solution, and mixtures thereof.

The caustic solution is generally a very concentrated sodium hydroxide solution, and is standard in the art of nickel hydroxide precipitation. As with prior art precipitation processes, the sodium hydroxide can be partially replaced by hydroxides of other alkali metal hydroxides, as long as they are soluble.

In one embodiment, the method of producing the composite material comprises the step of mixing the conductive material with the metal ion solution to form a suspension. The suspension is then mixed with the caustic solution in a reactor vessel. Hence, in this embodiment, the conductive material is suspended in the metal ion solution before being mixed with the caustic.

The conductive material is preferably nickel particles (which may be fibers). It is noted that while the remaining discussion of the method of making the composite material is in terms of nickel particles, all types of conductive materials (as discussed hereinabove) may be used.

Once suspended in the metal ion solution, the nickel particles act as nucleation sites for the precipitation of the positive electrode active material (hereinafter nickel hydroxide material). After the suspension is formed, the caustic solution is then mixed with the suspension to precipitate the nickel hydroxide material onto the nickel particle, thereby forming the deposit. As the nickel hydroxide deposits onto the nickel particle, the nickel particle becomes at least partially embedded in the nickel hydroxide material.

The inventors have noted the preferred aspect of adding the nickel particles to the reactor vessel by first suspending the nickel particles in the metal ion solution, especially when the metel ion solution is predominately a nickel sulfate solution. When added in this manner, nucleation and precipitation proceeded excellently. In an earlier trial (in which the metal ion solution was also predominately a nickel sulfate solution) the nickel particles were added independently to the reactor vessel. This case was unsuccessful, resulting in clumped metallic nickel particles outside of the nickel hydroxide. While not wishing to be bound by theory, the inventors believe that suspending the nickel particles in the metal ion solution may be preferred due to the acidic nature of the sulfate solution. It may be that the nickel particles are partially etched, providing either a roughened surface or an oxide free surface better for nucleation. When ammonium hydroxide is added to form a nickel ammonia complex (discussed below), it is also possible that the nickel ammonia complex which forms just prior to or simultaneous with the precipitation assists or promotes the desirable nucleation. It is still possible that direct introduction of the nickel particles to the precipitation reactor could work through the use of a wetting agent or other means.

In another embodiment of the method, a source of ammonium hydroxide is also provided. The ammonium hydroxide is mixed with the metal ion solution to form an amine complex with the metal ions. The amine complex is then reacted with the caustic solution to form the nickel hydroxide material. The step of mixing the ammonium hydroxide solution with the metal ion solution may occur before or concurrent with the step of mixing the metal ion solution and the nickel particles. The step of mixing the ammonium hydroxide solution with the metal ion solution may also occur after the step of mixing the metal ion solution and the nickel particles, but before the step of mixing the caustic solution with the suspension. Finally, the step of mixing the ammonium hydroxide solution with the metal ion solution may occur concurrent with the step of mixing the caustic solution with the suspension.

The method of the present invention may further comprise the step of separating the composite positive electrode material from the precipitation solution. The composite positive electrode material may be washed with deionized water and/or caustic solution.

The concentrations of the solutions are variable and generally known in the art. The nickel particles may form about 0.1% to about 35% by weight of the final nickel hydroxide powder. Present results indicate that the effect of the added nickel particles can be seen to start at about 2% by weight of nickel particles. After about 20% by weight, the reduction in active material is not compensated for by either the increase in conductivity or the decrease in isolated active material. More preferably, the nickel particles form about 2% to about 10% by weight of the nickel hydroxide powder.

EXAMPLE

A composite nickel hydroxide material was prepared by mixing a metal ion solution, a calcium nitrate solution, a caustic solution of NaOH, and an ammonium hydroxide solution in a reactor vessel.

The metal ion solution was prepared by adding 177 grams of $CoSO_4$, 15.5 grams $MgSO_4$ and 11.2 grams of $ZnSO_4$ to 0.058 gallons of water and 1.25 gallons of $NiSO_4$ solution. About 50 grams of the INCO T-210 nickel powder was added to the metal ion solution as a source of metallic nickel particles and continuously stirred.

The metal ion solution is added to the reactor vessel at a rate of about 0.058 gallons per hour. A solution of 66% calcium nitrate is concurrently added to the reactor vessel at a rate of about 0.0025 gallons per hour. Ammonium hydroxide is added to the reaction vessel at a rate of about 0.016 gallons per hour. Finally, a caustic solution comprising about 0.96 gallons of a 6.5M solution of NaOH is added to reaction vessel at a rate which is sufficient to keep the pH of the reaction vessel at about 11.3.

The reaction vessel is kept at a temperature of about 60° C. and is stirred at a rate of about 670 revolution per minute. The quantities of metal ion solution, calcium nitrate, caustic, and ammonium hydroxide used are sufficient to produce about 1 Kg of the composite nickel hydroxide material over a 24 hour period of time. After the composite nickel hydroxide material is formed, it is rinsed with deionized water or dilute caustic, and dried.

Also disclosed herein is a method for producing a composite positive electrode material comprising particles of active positive electrode material having nucleating particles at least partially embedded therein. The method comprises the step of combining a metal ion solution, a caustic solution, and the nucleating particles, whereby a precipitation solution including the composite positive electrode material is formed. In general, the method for producing the composite positive electrode material with nucleating particles is the same as the method discussed above with regards to using the conductive material. Nucleating particles (which need not be conductive) are used instead of the conductive material. Of course, the nucleating particles may be electrically conductive particles such as nickel particles.

Figure 3:
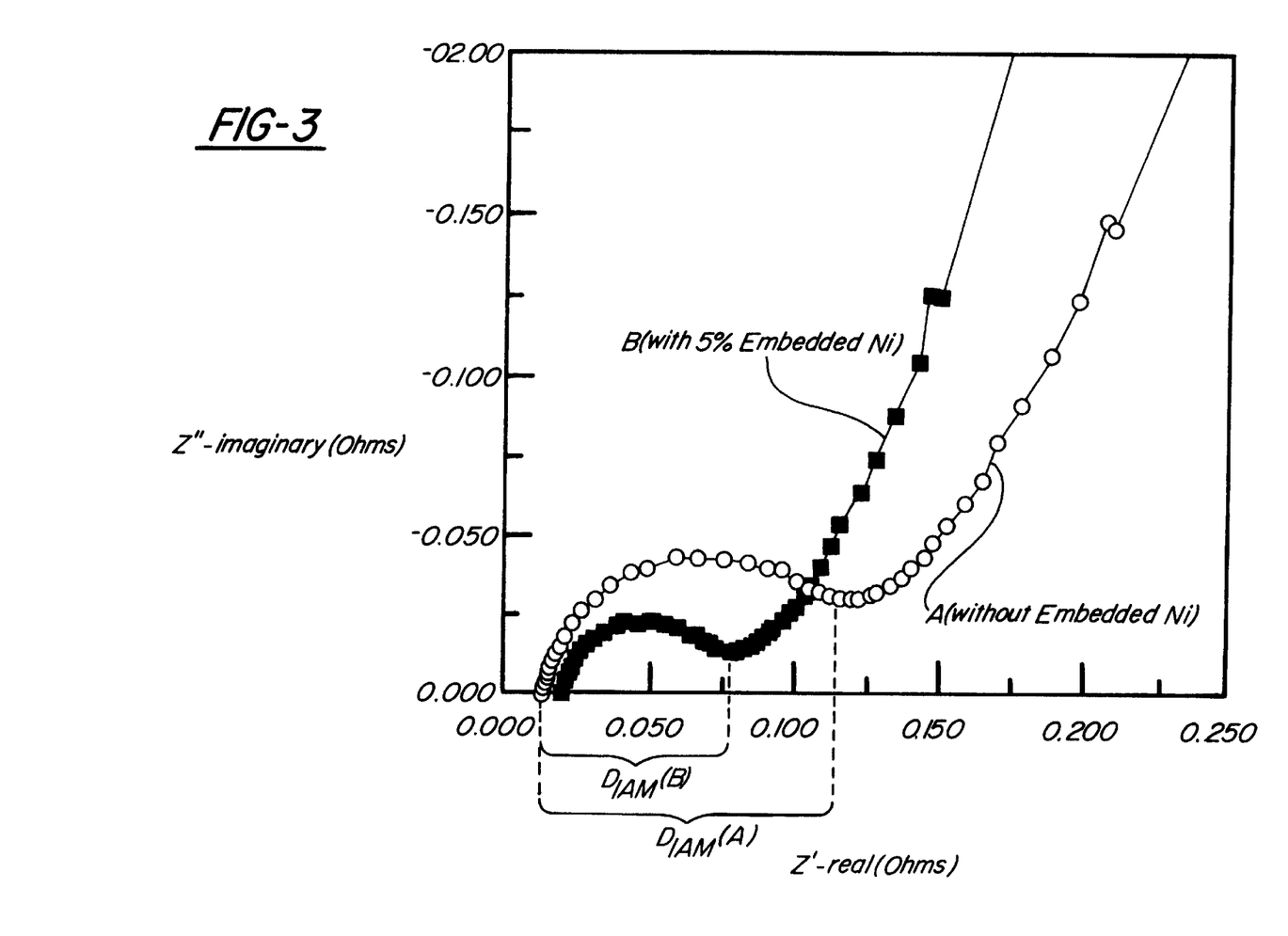
FIG. 3 shows complex impedance plots for positive electrodes comprising nickel hydroxide material formed with and without embedded nickel particles.

FIG. 3 shows the AC impedance measurements for positive electrodes comprising two different positive electrode materials. In general, the AC impedance measurements of a positive electrode is a plot showing the real portion of electrode impedance on the horizontal axis and the imaginary portion of electrode impedance on the vertical axis. The impedances are plotted as a function of a range of frequencies starting at a high frequency of about 10 kHz and going to a low frequency of about 20 uHz.

Referring to FIG. 3, Plot A is the AC impedance measurements of a positive electrode comprising a nickel hydroxide active material. Plot B is the AC impedance measurement of a positive electrode comprising the composite positive electrode material of the present invention. The composite material comprises the same nickel hydroxide active material (from which Plot A was made) with the addition of about 5% by weight of embedded nickel particles. An important electrical parameter of a battery electrode is the "charge transfer resistance", $R_{CT}$. The charge transfer resistance is calculated from the nyquist plot describing the AC impedance of the electrode over a range of frequencies.

The charge transfer resistance corresponds to the diameter of the "high frequency semicircle" of the AC impedance plot multiplied by the number of grams of positive electrode material. Referring to FIG. 3, this diameter is denoted as Diam(A) for Plot A and Diam(B) for Plot B. The Diam(A) was measured to be about 0.113 ohms while the number of grams of the positive electrode material (nickel hydroxide without embedded nickel) was about 2.85 grams. Hence, the charge transfer resistance $R_{CT}(A)$ of the nickel hydroxide material without embedded nickel was about 0.322 ohms-gram.

The diameter of the semi-circle of Plot B, Diam(B) was measured to be about 0.062 ohms while the number of grams of the positive electrode material (the same nickel hydroxide material with 5% embedded Ni) was about 2.94 grams. Hence, the charge transfer resistance $R_{CT}(B)$ of the nickel hydroxide material with the 5% embedded nickel fibers was about 0.182 ohms-gram. Hence, the charge transfer resistance for the nickel hydroxide material with embedded nickel, $R_{CT}(B)$, was significantly lower than the charge transfer resistance for the nickel hydroxide material without the embedded nickel $R_{CT}(A)$. The addition of the nickel particles to the nickel hydroxide material may lower the charge transfer resistance of the positive electrode material by over 50%.

Also disclosed herein is a positive electrode material characterized by a charge transfer resistance less than about 0.22 ohms-gram. Preferably, the positive electrode material has a charge transfer resistance is less than about 0.20 ohms-gram. Most preferably, the charge transfer resistance is less than about 0.19 ohms-gram.

Figure 4:
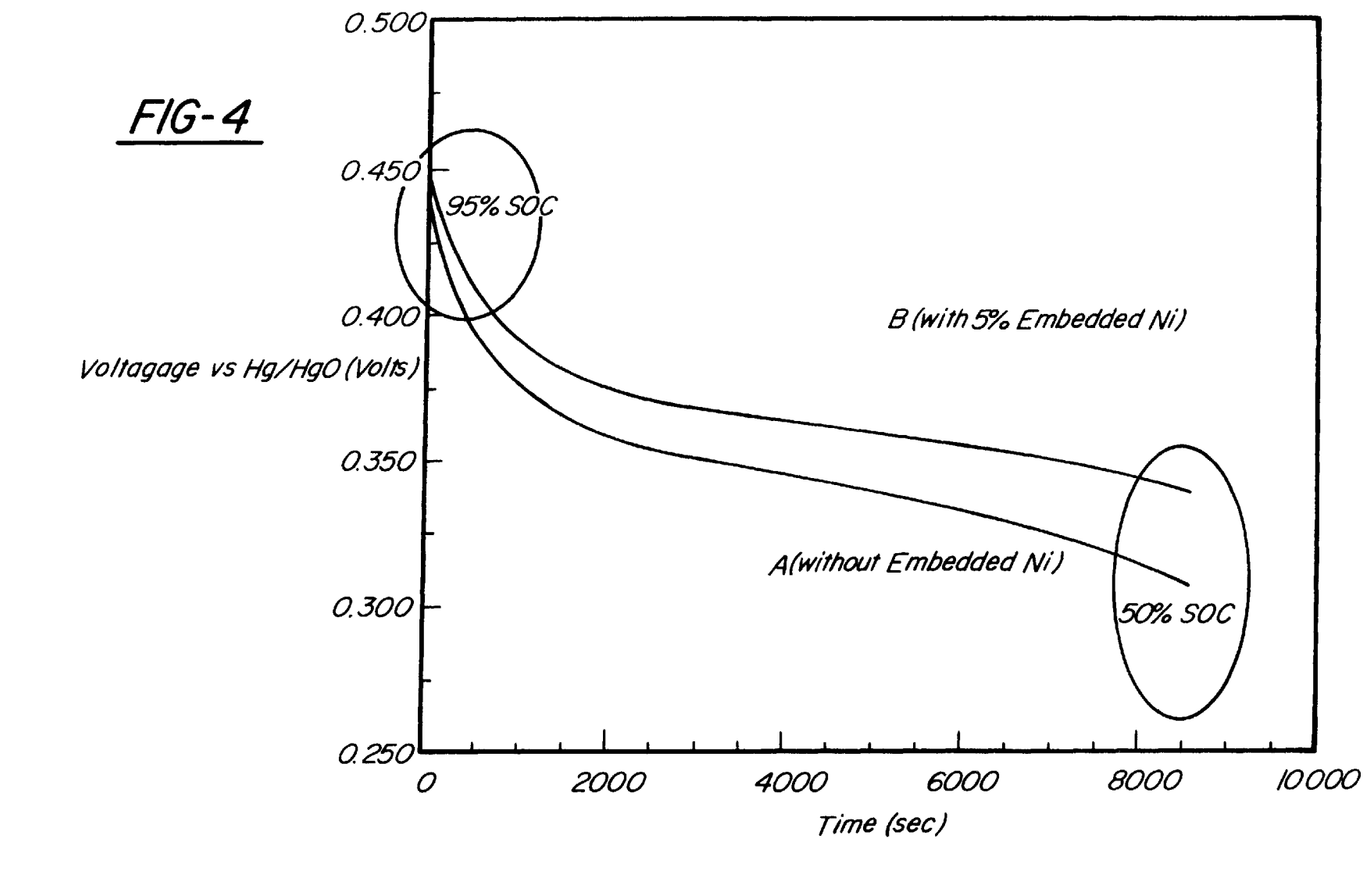
FIG. 4 shows discharge curves for positive electrodes comprising nickel hydroxide material formed with and without embedded nickel particles.

FIG. 4 shows positive electrode discharge curves A and B. The discharge curves A, B show the positive electrode half cell potentials relative to an Hg/HgO reference electrode. The potentials are given from about 95% state of charge to about 50% state of charge. Discharge curve A is for a positive electrode having an active electrode material which comprises a nickel hydroxide material without any embedded nickel particles. Discharge curve B is for a positive electrode having an active material comprising the same nickel hydroxide material with about 5% by weight of embedded nickel fibers (i.e., about 5% of the INCO T-210 nickel particles). Comparison of the discharge curves shows that the addition of the nickel fibers increases the half cell potential of the positive electrode over the entire range of state of discharge (i.e., from 95% to 50%). Though not wishing to be bound by theory, it is believed that the increased potential is at least partially due to the decreased charge transfer resistance discussed above.

Capacity and utilization are also greatly enhanced by the present invention. Positive electrodes were prepared for half-cell testing by pasting a slurry of about 5% by weight of Co metal, about 5% by weight of CoO with PVA binder and the remainder active material onto foam metal substrates.

The respective electrode samples included approximately 2 grams of active material paste (including binder and external additives, but not including the foam metal substrate) and were tested in an excess electrolyte configuration with the following results. "Sample A" is a nickel hydroxide positive electrode material without any embedded nickel fibers. "Sample B" is the same nickel hydroxide material with about 5% by weight of the embedded nickel fibers (5% of INCO T-210 nickel particles). "Commercial" is a commercially available material. The capacities of the positive electrode materials are shown in the Table below.

TABLE

| Sample | mAh/g |
| --- | --- |
| Commercial | 230 |
| A (without embedded nickel) | 276 |
| B (with 5% embedded nickel) | 292 |

As can be seen from the Table, the inclusion of the 5% nickel fibers in the nickel hydroxide material greatly enhances the utilization and capacity of the active material.

It is noted that the composite positive electrode material of the present invention may provide for a "fully pasted positive electrode" that does not use a foam or fiber skeleton or substrate. Usually, this embodiment is formed from a standard nickel hydroxide material with externally conductive additives and a plastic binder. The composite electrode material of the present invention could provide the improved power and rate discharge needed for practical commercialization of this type of electrode.

The term "substrate" as used herein relates to any electrically conductive support for the active positive electrode material. It may take the form of a foam, grid, plate, foil, expanded metal or any other type of support structure. It may take the form of conventional nickel foils, plates and foams, as well as, carbon networks, fibers or particulate and cobalt oxyhydroxide networks. It may be made from any electronically conductive material. Preferably, it is made from a metal such as nickel or a nickel alloy. More preferably, the substrate for the positive electrode is a nickel foam.

It is to be understood that the disclosure set forth herein is presented in the form of detailed embodiments described for the purpose of making a full and complete disclosure of the present invention, and that such details are not to be interpreted as limiting the true scope of this invention as set forth and defined in the appended claims.

We claim:

1. A method for making a composite positive electrode material comprising particles of positive electrode material having nucleating particles at least partially embedded within the interior of said positive electrode material, said method comprising the step off:

combining a metal ion solution, a caustic solution, and said nucleating particles, whereby a precipitate including said composite positive electrode material is formed.

2. The method of claim 1, wherein said combining step comprises the steps of:

mixing said metal ion solution and said nucleating particles, thereby forming a suspension of said nucleating particles in said metal ion solution; and mixing said caustic solution with said suspension.

3. The method of claim 2, wherein said combining step further comprises the step of:

mixing an ammonium hydroxide solution with said metal ion solution to form a metal amine complex solution.

4. The method of claim 3, wherein said mixing said ammonium hydroxide step occurs before said step of mixing said metal ion solution with said nucleating particles.

5. The method of claim 3, wherein said mixing said ammonium hydroxide step occurs concurrently said step of mixing said metal ion solution with said nucleating particles.

6. The method of claim 3, wherein said mixing said ammonium hydroxide step occurs after said step of mixing said nucleating particles and said metal ion solution, but before said step of mixing said caustic solution with said suspension.

7. The method of claim 3, wherein said mixing said ammonium hydroxide step occurs concurrent with said step of mixing said caustic solution with said suspension.

8. The method of claim 1, wherein said method further includes the step of washing said composite positive electrode material with deionized water.

9. The method of claim 1, wherein said method further includes the step of washing said composite positive electrode material with caustic solution.

10. The method of claim 1, wherein said metal ion solution comprises metal ions of one or more elements selected from the group consisting of nickel ions, and manganese ions.

11. The method of claim 1, wherein said metal ion solution further comprises metal ions of one or more elements selected from the group consisting of Al, Ba, Bi, Ca, Co, Cr, Cu, Fe, In, K, La, Li, Mg, Mn, Na, Nd, Pb, Pr, Ru, Sb, Sc, Se, Sn, Sr, Te, Ti, Y, and Zn.

12. The method of claim 1, wherein said metal ion solution is selected from the group consisting of a metal sulfate solution, a metal nitrite solution, and mixtures thereof.

13. The method of claim 12, wherein said metal ion solution further comprises metal ions of one or more elements selected from the group consisting of Al, Ba, Bi, Ca, Co, Cr, Cu, Fe, In, K, La, Li, Mg, Mn, Na, Nd, Pb, Pr, Ru, Sb, Sc, Se, Sn, Sr, Te, Ti, Y, and Zn.

14. The method of claim 1, wherein said metal ion solution comprises nickel ions.

15. The method of claim 1, wherein said metal ion solution comprises manganese ions.

16. The method of claim 1, wherein said nucleating particle orients the crystallites of said particle of positive electrode material so that the conductivity of said material is increased.

17. The method of claim 1, wherein said nucleating particle determines the average size of the crystallites of said particle of positive electrode material so that the conductivity of said material is increased.

18. The method of claim 1, wherein said nucleating particle is totally embedded within said particle of positive electrode material.

19. The method of claim 1, wherein said nucleating particle comprises a conductive material.

* * * * *